(12) United States Patent
Levine

(10) Patent No.: US 7,447,686 B2
(45) Date of Patent: Nov. 4, 2008

(54) COMPUTER-IMPLEMENTED SYSTEM AND METHOD FOR HANDLING DATABASE STATEMENTS

(75) Inventor: Frederick J. Levine, Durham, NC (US)

(73) Assignee: SAS Institute Inc., Cary, NC (US)

( * ) Notice: Subject to any disclaimer, the term of this patent is extended or adjusted under 35 U.S.C. 154(b) by 921 days.

(21) Appl. No.: 10/303,106

(22) Filed: Nov. 22, 2002

(65) Prior Publication Data

US 2004/0103100 A1 May 27, 2004

(51) Int. Cl.
*G06F 7/00* (2006.01)
*G06F 17/30* (2006.01)

(52) U.S. Cl. .................... 707/4; 707/3; 707/100

(58) Field of Classification Search ............ 707/3, 707/4, 100

See application file for complete search history.

(56) References Cited

U.S. PATENT DOCUMENTS

| 5,421,008 | A | * | 5/1995 | Banning et al. | 707/4 |
| 5,590,319 | A | * | 12/1996 | Cohen et al. | 707/4 |
| 5,659,725 | A | * | 8/1997 | Levy et al. | 707/3 |
| 6,041,344 | A | * | 3/2000 | Bodamer et al. | 709/203 |
| 6,941,298 | B2 | * | 9/2005 | Chow et al. | 707/3 |

* cited by examiner

*Primary Examiner*—Neveen Abel-Jalil
*Assistant Examiner*—Jacob F Bétit
(74) *Attorney, Agent, or Firm*—Jones Day

(57) ABSTRACT

A computer-implemented system and method for handling a database statement from a first database system. The database statement is formatted according to a language format used by the first database system. Database language difference data is accessed so that a database specific statement may be generated which is operational within a different type of database system.

50 Claims, 19 Drawing Sheets

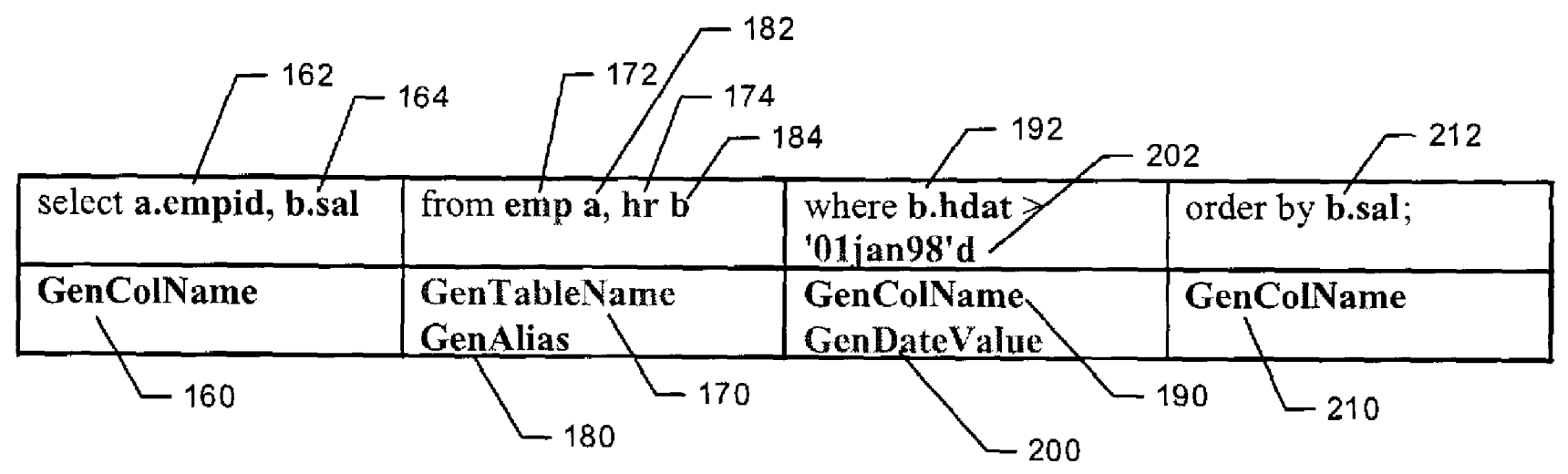

| select a.empid, b.sal | from emp a, hr b | where b.hdat > '01jan98'd | order by b.sal; |
|---|---|---|---|
| GenColName | GenTableName GenAlias | GenColName GenDateValue | GenColName |

FIG. 7

| SQL Command | Command Expression Component | Command Phrase | Corresponding Phrase Component |
|---|---|---|---|
| SELECT | GenQuery | select list | GenSelectList |
| | | from | GenFrom |
| | | where | GenWhere |
| | | group by | GenGroupBy |
| | | having | GenHaving |
| | | order by | GenOrderBy |
| UPDATE | GenUpdate | update table | GenUpdTable |
| | | set list | GenSetList |

FIG. 8

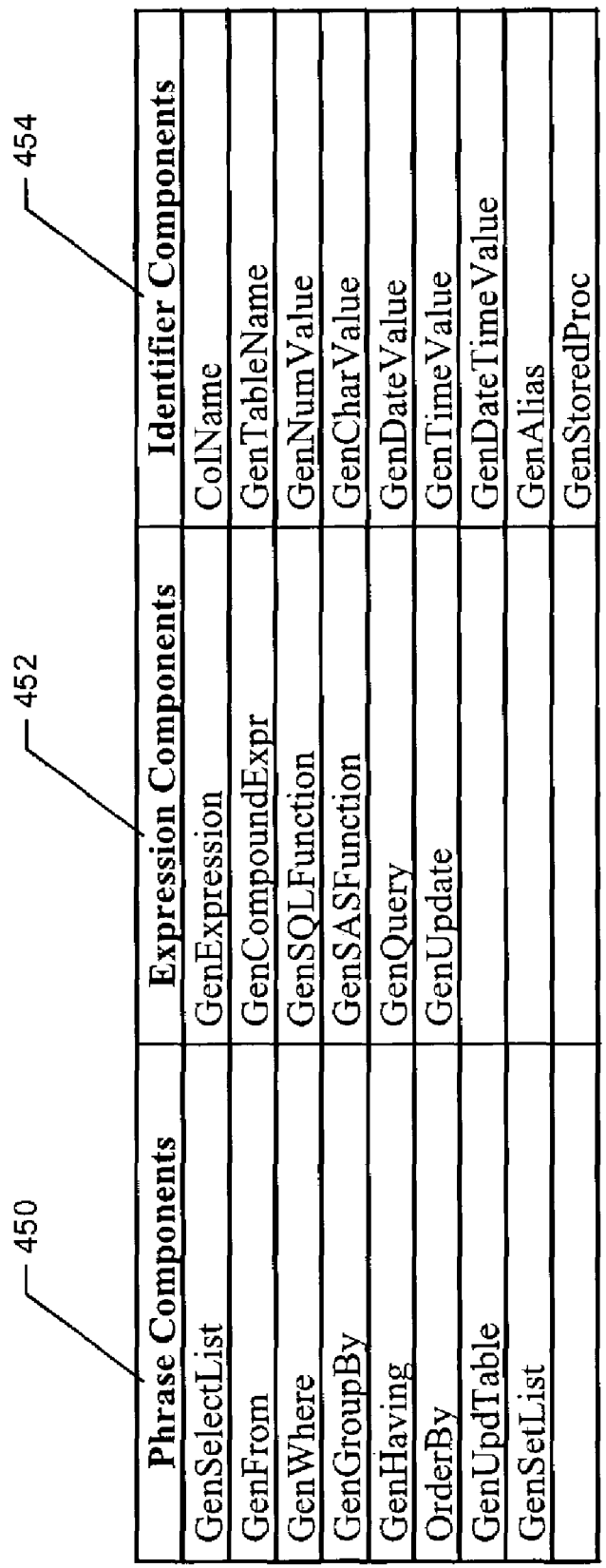

| Phrase Components | Expression Components | Identifier Components |
|---|---|---|
| GenSelectList | GenExpression | ColName |
| GenFrom | GenCompoundExpr | GenTableName |
| GenWhere | GenSQLFunction | GenNumValue |
| GenGroupBy | GenSASFunction | GenCharValue |
| GenHaving | GenQuery | GenDateValue |
| OrderBy | GenUpdate | GenTimeValue |
| GenUpdTable | | GenDateTimeValue |
| GenSetList | | GenAlias |
| | | GenStoredProc |

FIG. 12

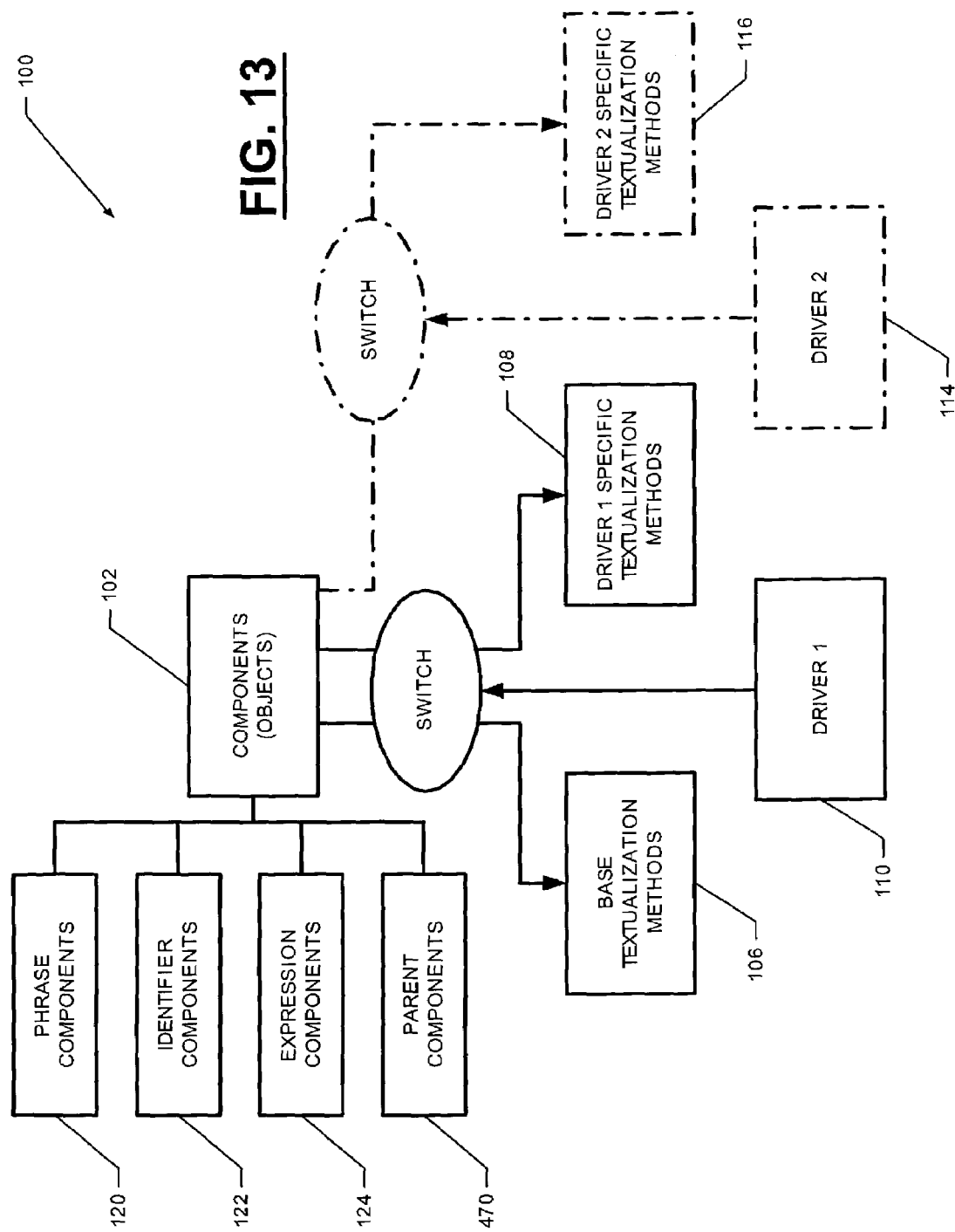

```
sybGenCompoundExpr(tqueryh)
{
    if (tqueryh->tree->code == SQL_CONC)   // CONCATENATION node
    {
        // Textualize Sybase-specific concatenation
    }
    else
    {
        tkrc = ParentGenCompoundExpr(tqueryh);   // Let the default method
                                                 //    handle the rest!
    }
}
```

FIG. 14

```
oraGenWhere(tqueryh)
{
    if ( (tqueryh->tree->code == SQL_OTRJ) &&      // NON-standard Outer joins?
         (non-standard_OJ_server) )
    {
        // Textualize Oracle-specific outer join WHERE conditions
    }
    else
    {
        tkrc = ParentGenWhere(tqueryh); // Let the default method handle the rest
    }
}
```

550 — if block
560 — Textualize comment
570 — else block

FIG. 15

| Standard Component | Parent Component |
|---|---|
| GenColName | ParentGenColName |
| GenCompoundExpr | ParentGenCompoundExpr |
| GenFrom | ParentGenFrom |
| etc. | etc. |

FIG. 16

COMPUTER-IMPLEMENTED SYSTEM AND METHOD FOR HANDLING DATABASE STATEMENTS

TECHNICAL FIELD

The present invention relates generally to computer-implemented database systems and more particularly to database statement operations.

BACKGROUND

Data access across different database platforms proves difficult due to the platforms using varying database commands. For example, although the structured query language (SQL) is based on a well-documented ANSI standard, in reality most database systems, such as those from Oracle, Sybase, Business Objects, SAS, or Brio, implement a superset of the ANSI standard. Variations in the superset provide an obstacle in cross-platform database operations.

SUMMARY

In accordance with the teachings provided herein, a system and method are provided for handling a database statement from a first database system. The database statement is formatted according to a language format used by the first database system. Database language difference data is accessed so that a database specific statement may be generated which is operational within a different type of database system.

BRIEF DESCRIPTION OF THE DRAWINGS

FIG. 7 is a tabular representation depicting identifier component examples;

FIG. 8 is a tabular representation depicting an example of component processing using SELECT and UPDATE commands;

FIG. 12 is a tabular representation illustrating several exemplary components that may be involved in processing an SQL SELECT statement;

FIG. 13 is a block diagram illustrating use of an additional component that may be used in conjunction with overrides to standard components;

FIGS. 14 and 15 are listings of computer instructions to illustrate textualization examples involving different types of database systems;

FIG. 16 is a tabular representation showing an optional naming convention for parent components;

DETAILED DESCRIPTION

Figure 1:
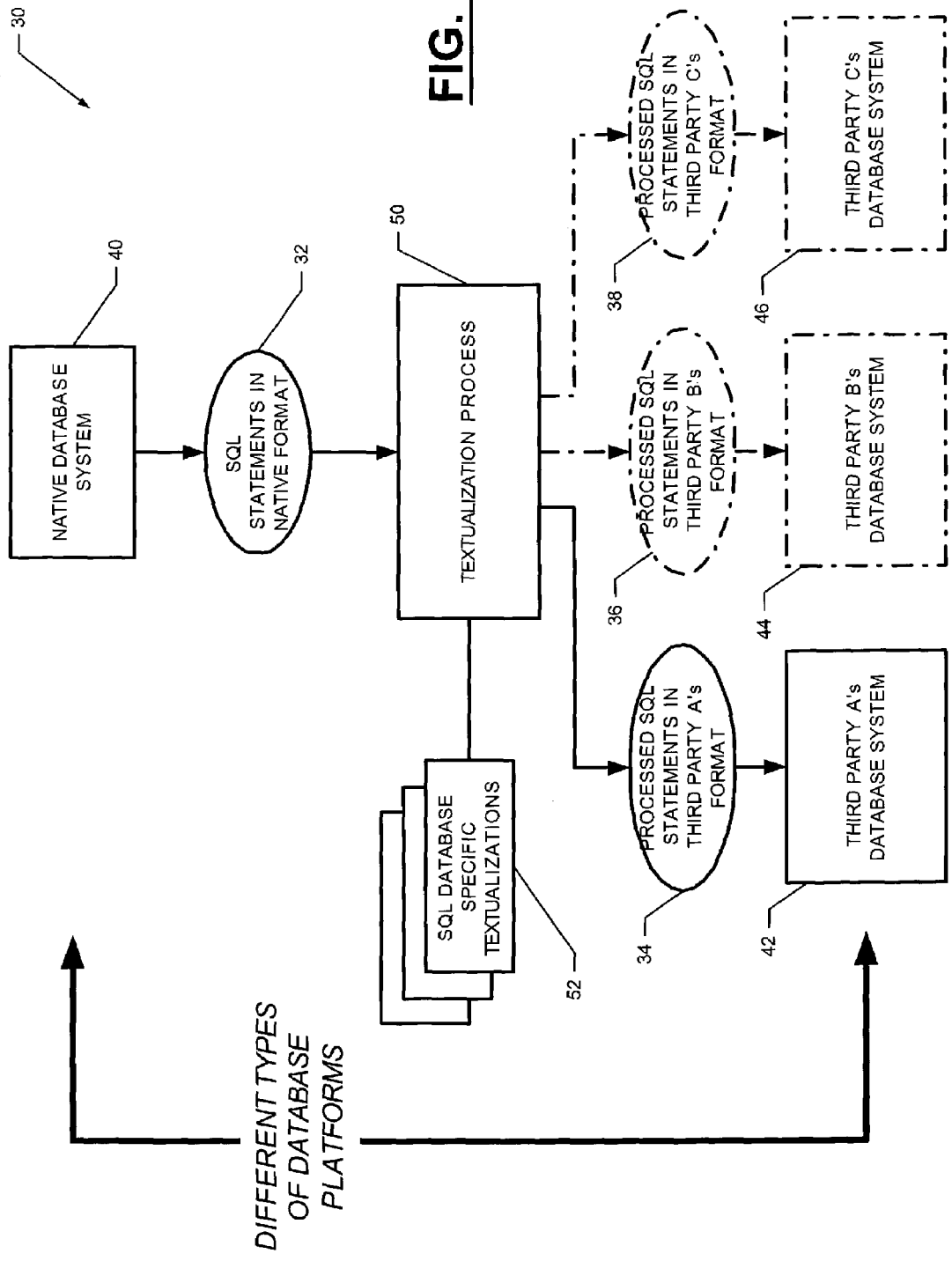
FIG. 1 is a block diagram depicting software and computer components that allow database statements to be automatically converted so that they may be used in a different type of database system.

FIG. 1 depicts a computer-implemented system 30 that allows database statements 32 to be automatically converted from one database platform format to another. Through their conversion, database statements 32 executable within one system 40 may be utilized in one or more different types of database systems (42, 44, 46). This provides, among other things, the ability to transparently manipulate data from virtually any database system.

Within the system 30, a textualization process 50 addresses the complexity of translating a native database statement 32 dialect into a variety of third party database dialects (34, 36, 38) by allowing the common parts of the default syntax of functionality to be shared between a native database and a third party database. The textualization process 50 utilizes database specific textualizations 52 to translate the common parts to the third party database dialect.

For example, if a native database system 40 uses an outer join syntax to be specified in an SQL query statement 32 that is different from what a third party database system 42 uses, then the textualization process 50 creates based upon the specific textualizations 52 a processed SQL command 34 for the third party database system 42 that employs the third party's outer join syntax. The processed SQL command 34 is then able to be executed within the third party database system 42. As another example, a native database system 40 and a third party database system 42 may both support a function that performs an identical operation but differs in name and/or format. Using the specific textualizations 52, the textualization process 50 translates the SQL statement 32 having the function in the native format into an SQL statement 34 having the function in the third party's format. It should be understood that the terms "native" and "third party" are relative terms in that what is a native database system for one company may be a third party database system for another company. Accordingly, the terms "native" and "third party" database systems may be generalized to a first type of database system that generates a database statement that is processed by the textualization process 50 and provided to a different type of database system. It should be further understood that different types of databases refer to database systems that contain differences in their respective database statement format and/or syntax, such as utilizing a different superset of an ANSI database statement standard.

The textualization system 30 is highly flexible in that a third party database system 42 may utilize the textualization process 50 to convert and send database commands to the native database system 40. It is also noted that a native database system 40 may send database statements 32 to other third party database systems (44 and 46). The textualization system 30 contains textualization information and/or operations 52 that are specific to each of the third party database systems (42, 44, 46). The textualization system 30 has the flexibility of providing an SQL statement 32 from the native database system 40 to a single third party database system 42, or may provide the same native SQL statement 32 to multiple third party database systems (42, 44, 46) substantially concurrently or serially.

Figure 2:
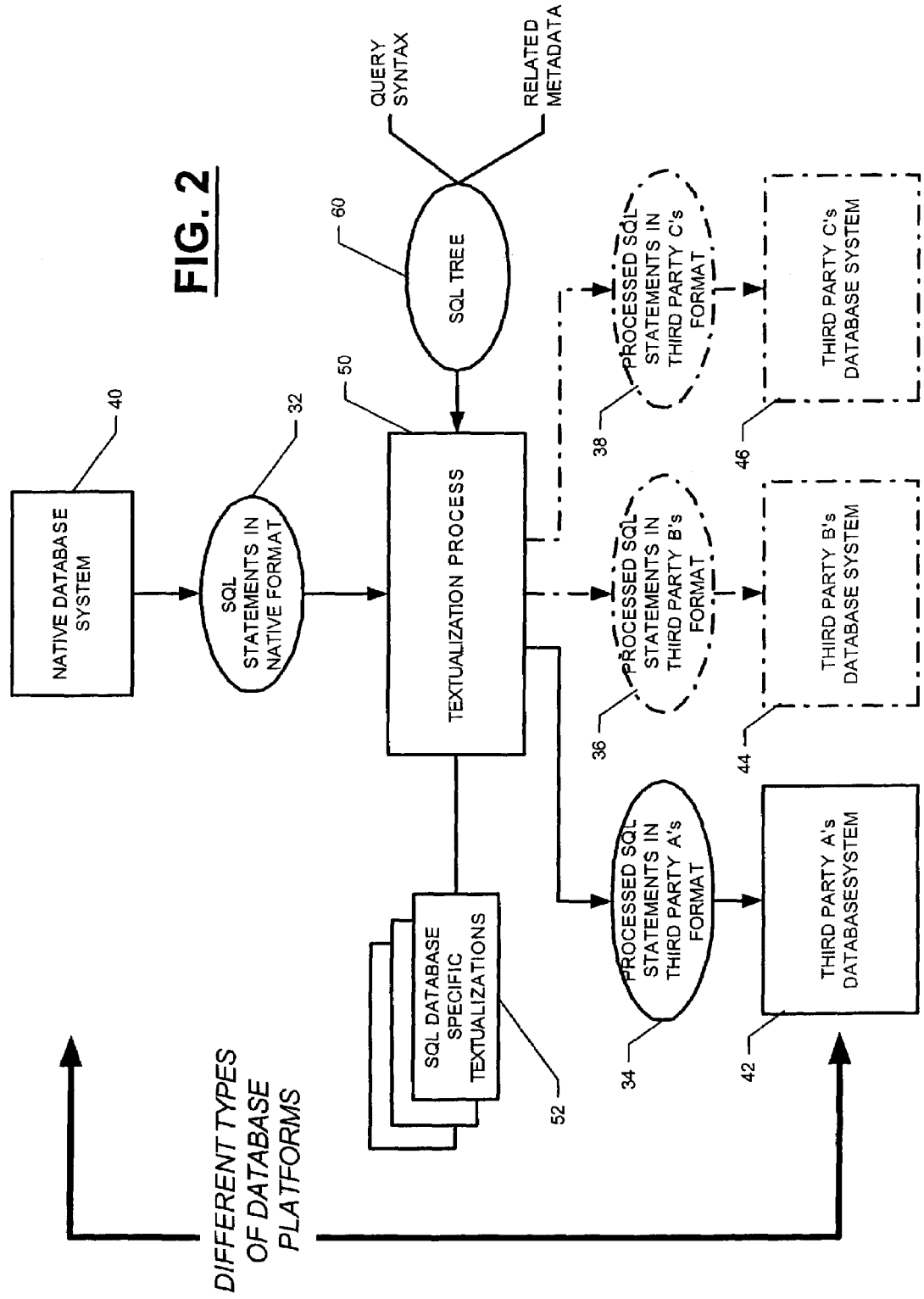
FIG. 2 is a block diagram showing an example where the textualization process uses a tree to represent a database statement.

FIG. 2 shows an example where an SQL tree 60 is used by the textualization process 50 to process an SQL statement 32. The SQL tree 60 represents the syntax of a native database's SQL statement 32 and its related metadata (e.g., table names, column names, etc.). The tree 60 may contain a hierarchical arrangement of nodes representative of the SQL syntax and metadata to be processed. If for example the SQL statement 32 specified that the values from two different columns are to be concatenated, then the SQL tree 60 would contain a node that specifies that a concatenation operation is to be performed.

The textualization process 50 compartmentalizes an SQL statement 32 into logical text pieces or components which are initially provided based on a default SQL dialect. The logical text pieces are represented in the SQL tree 60. Any of these text pieces can be overridden by a third party SQL provider that utilizes a different SQL dialect than the default, hence allowing for granular customization and code reuse. As an illustration, a database system from SAS Institute Inc. has an SQL language which has differences from other vendor's SQL. The textualization process 50 allows a SAS SQL statement to be converted into a third party vendor-specific SQL in order to successfully submit a table request to the third party's relational database system (RDBMS). This is accomplished by representing the SAS SQL statement as an SQL tree 60. The SQL tree 60 is passed to the textualization process 50 to convert the tree 60 into the text of the third party vendor-specific SQL query, taking into account any DBMS-specific SQL. The textualization operation happens in this example just prior to the call to a prepare( ) or executeDirect( ) routine. These standardized routines then pass the SQL query to an RDBMS in the form of text. It is noted that in an SQL-centric table services model, an SQL query typically gets passed to either the prepare( ) or executeDirect( ) routines (depending on context). A call to either of these routines, therefore, constitutes a request to an RDBMS.

An application or program that operates within a native database system may wish to access data in a remote third party database system under such situations as when the application is a data mining application that needs data from the third party system for operations to be performed within the data mining application. Other application examples include requests for metadata that are stored in a different type of database system. It should be understood that any system that uses SQL or a similar type of database technique may utilize the textualization system.

Figure 3:
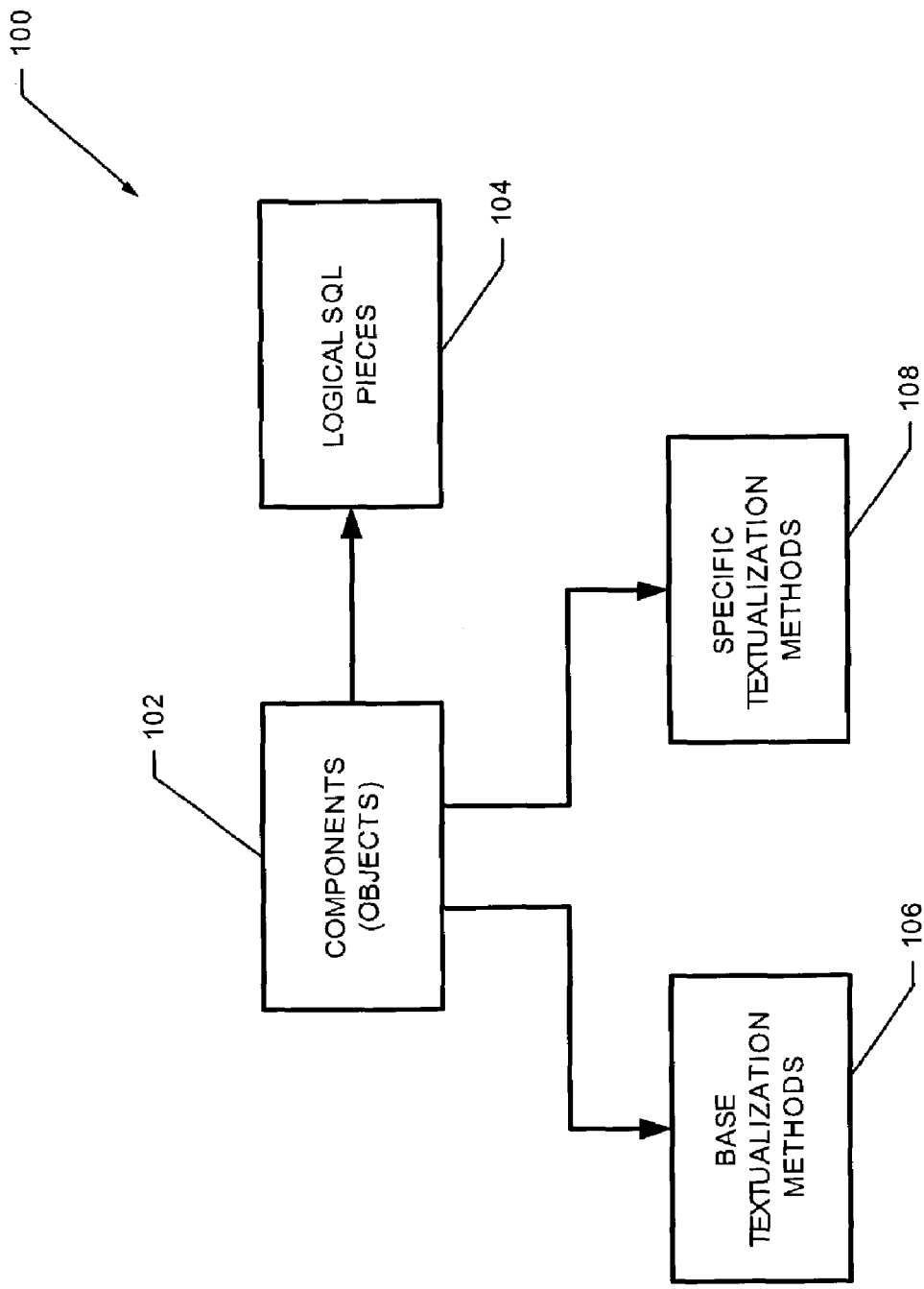
FIGS. 3-5 are block diagrams illustrating object-oriented approaches to creating disparate SQL text for third party data access.

The textualization system may be implemented in many ways and through different types of programming languages. FIG. 3 illustrates an object-oriented approach 100 to creating disparate SQL text for third party data access. The object-oriented approach 100 contains SQL component objects 102 where each component corresponds to a logical "piece" 104 of an SQL statement (as may be found in an SQL tree). An SQL component defaults to a provided base or default native SQL text method 106. However, when there are third party-specific differences for a particular component, then the component utilizes the third party specific textualization method(s) 108 to handle the differences.

Figure 4:
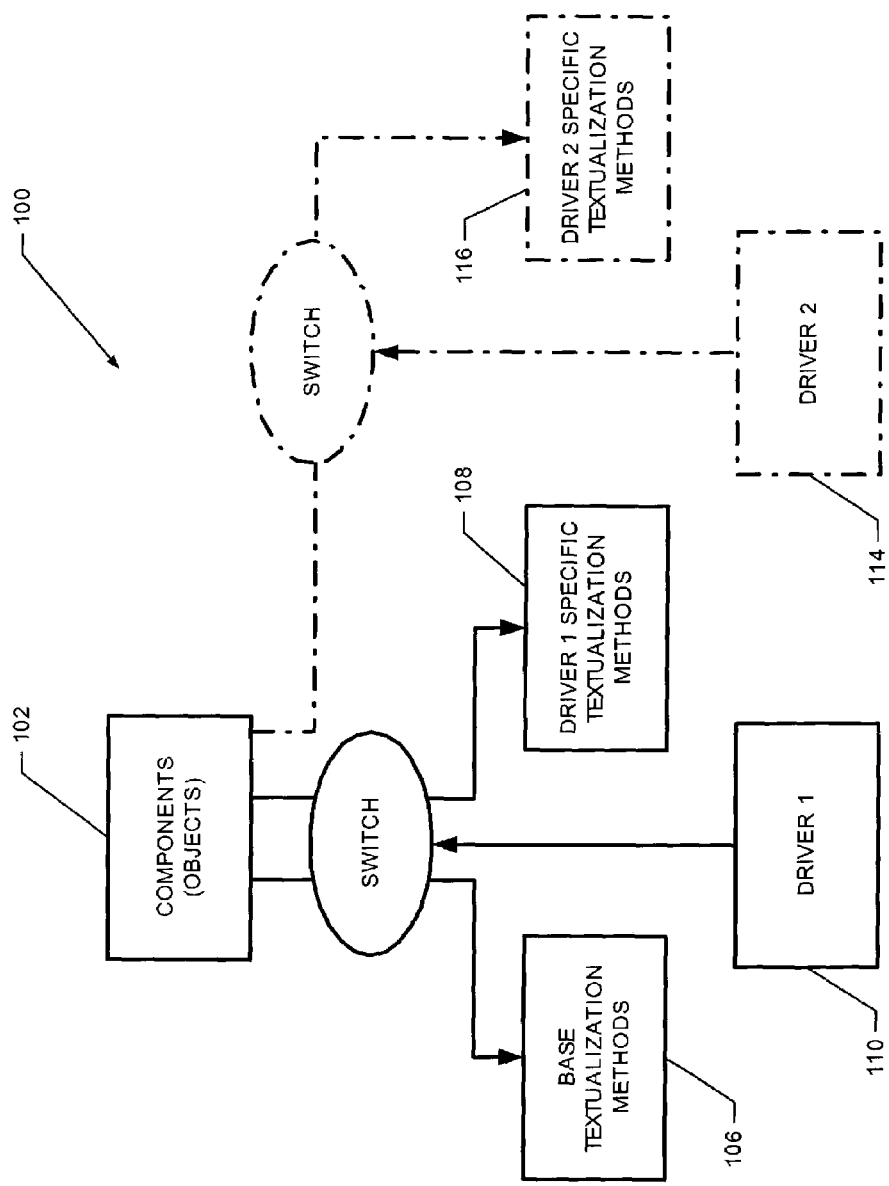

As shown in FIG. 4, when there are third party-specific differences for a particular component, a driver object 110 is responsible for creating an "override" 112 to the default method 106. The driver object 110 specifies to a component object 102 when a component object 102 is to point to specific textualization method 112 instead of its base textualization methods. Optionally, only the driver 110 knows about its datasource-specific SQL syntax 112.

In order to textualize for multiple different types of database systems, different drivers (110, 112) are associated with different third party platforms. For example, a first driver object 110 might point a component object 102 to use an "override" 108 to the default method 106 so that the component object 102 may textualize an SQL statement that can be used within a Sybase datasource system. A second driver object 114 might point the component object 102 to use an "override" 116 to the default method 106 so that the component object 102 may textualize an SQL statement that can be used within an Oracle datasource system.

The net effect of this object-oriented mechanism 100 is a driver-customized set of components where the driver need only supply an override method when a specific SQL construct differs from the default SAS SQL syntax. This design maximizes code reusability while pushing any DBMS-specific SQL text processing down to the driver, thereby distributing functionality more equitably.

Figure 5:
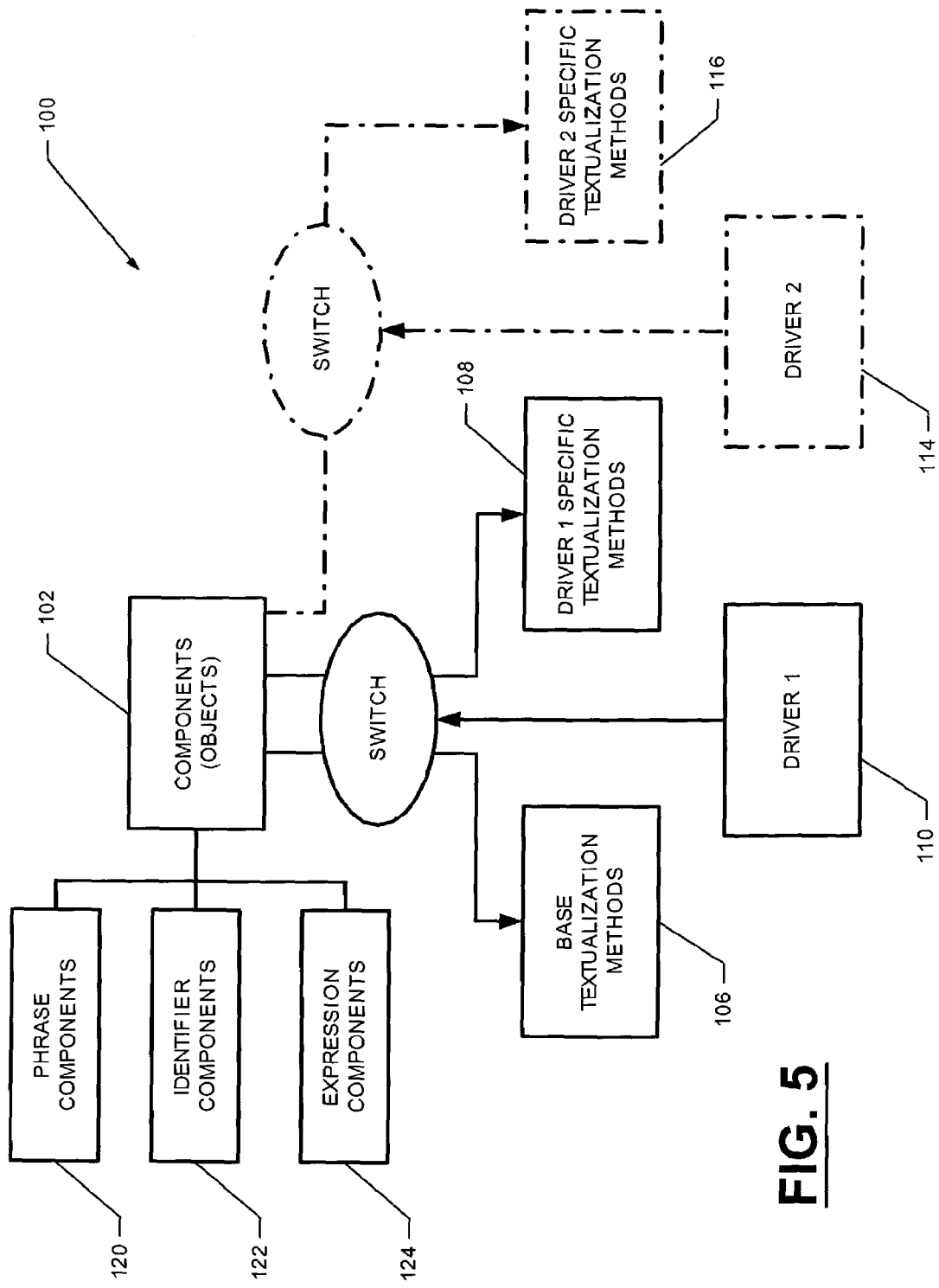
Figure 6:
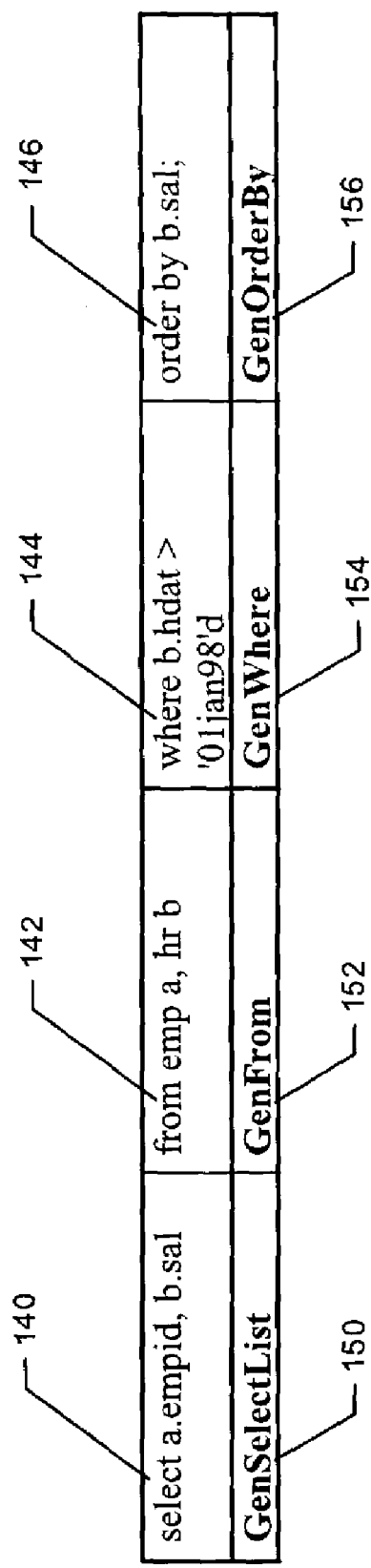
FIG. 6 is a tabular representation depicting phrase component examples.

With reference to FIG. 5, components may be assigned to handle different pieces of the native SQL statement. The different components may be: phrase components 120; identifier components 122; and expression components 124. Phrase components 120 handle textualization of SQL statement clauses or phrases, such as WHERE clauses or FROM clauses found in SQL select statements. To understand phrase components 120, the following exemplary SQL query statement is dissected:

select a.empid, b.sal from emp a, hr b where b.hdat > '01jan1998'd order by b.sal;

At the highest level we can think of this query as a group of ordered phrases (140, 142, 144, 146) as shown in FIG. 6. Phrase 140 of the query is a SELECT phrase; phrase 142 is a FROM phrase; phrase 144 is a WHERE phrase; and phrase 146 is an ORDER BY phrase. These phrases (140, 142, 144, 146) provide the high-level context for the query. Each phrase is represented and processed by a component object (150, 152, 154, 156) whose default text method can be overridden by a driver at this "high level". The phrase components (150, 152, 154, 156) textualize large pieces of a query that correspond to high-level SQL operations, e.g., FROM clauses, WHERE clauses, ORDER BY clauses, etc.

Typically, a driver would not have to override phrase component methods because the general syntactical layout of phrases tends to be relatively standard across RDBMSs. However, exceptions may exist, such as those involving RDBMSs that support non-standard outer joins. In addition, some ERP (enterprise resource planning) systems may have the need for phrase overrides since their "SQL" tends to be proprietary and very non-standard.

Identifier components are next discussed in reference to FIG. 7 using the query example above. We can further break down the phrases as collections of low-level "physical" entities. These low-level "entities" can be thought of as identifiers because they represent a real physical entity in an SQL query. Fully qualified table names, column names, literals, and aliases fall into this category of components. As shown in FIG. 7, the identifier component GenColName 160 textualizes the column names a.empid 162 and b.sal 164 within the SELECT phrase; the identifier component GenTableName 170 textualizes the table names emp 172 and hr 174 within the FROM phrase; the identifier component GenAlias textualizes the aliases a 182 and b 184 within the FROM phrase. It is noted that aliases are a unique class of identifiers in that they are only valid in GenSelectList and GenFrom (and typically not allowed in filter clauses). The identifier component GenColName 190 textualizes the column name b.hdat 192 within the WHERE phrase; the identifier component GenDateValue 200 textualizes the date value 202 within the WHERE phrase; the identifier component GenColName 210 textualizes the column name b.sal 212 within the ORDER BY phrase.

Components may use overrides to handle third party identifier differences, such as differences with respect to the date literal components. As another example, drivers may be used for several third party datasources to provide overrides for numeric literal components.

Expression components are discussed next. So far we have seen components that operate on high-level SQL phrases and low-level physical identifiers. The SQL "entities" in the query example above have, thus far, been limited to column names, table names, and literals—all of which are physical entities. It should be noted, however, that the SQL syntax allows for much greater complexity in its entities—all or a portion of which the textualization system may handle. An SQL "entity" can be:
- a physical column
- a derived column
- a literal
- a physical table
- a subquery
- a stored procedure
- a function To further illustrate the breadth of SQL statements that the textualization system may handle, the following queries that conform to ANSI syntax are shown:
- select x+1 from a;
- select x+1 asx×1 from a;
- select max(a), (select x from b), x from (select * from emp where empid>10) as subemp where 2;
- select 'tom' as brian from emp where (empid+1)>100;
- select min(sal+20000) from emp where (select dept from emp)='SALES';

In order to efficiently process such SQL syntaxes and entities, expression components are used as a more abstract type of component. Optionally, expression components provide a common entry point into all forms of an SQL entity and to this end, SQL entities in a query are initially processed as expressions. (Note that aliases may be an exception since they are only valid within the GenSelectList and GenFrom phrase components as described later in reference to FIG. 11). A generic expression component, GenExpression, may be used which is the "catch-all" expression method through which SQL entities are initially processed. At the point where the GenExpression component is called, the SQL entity can be an identifier (e.g., column, table, literal) or it can be another, more granular expression that has more context than the generic GenExpression. Such "granular" expressions processed by GenExpression are SQL functions, compound expressions, third party (or native) functions (e.g., SAS functions), and SQL commands. Function expressions treat each function argument as a generic expression (since arguments can typically be any form of SQL entity). A compound expression includes an SQL keyword or operator combined with one or more other expressions, i.e., "empid is null", "a+b", IN clauses. It is noted that if an SQL is used, then the tree node type representing the keyword or operator may identify an expression as compound. Phrase components correspond to the clauses (or phrases) of a command and may be processed in an order of precedence.

An example of component processing is shown in FIG. 8 using SELECT and UPDATE commands. Two SQL commands are shown in column 250—a SELECT command and an UPDATE command. Column 252 lists that the command expression component GenQuery is used to determine what command phrase components are needed to textualize the SELECT command. Column 254 lists the order in which the phrases are processed, and column 256 lists the command phrase components that deal with a command phrase. As an illustration, the select list command phrase is textualized by its corresponding phrase component GenSelectList.

Figure 9:
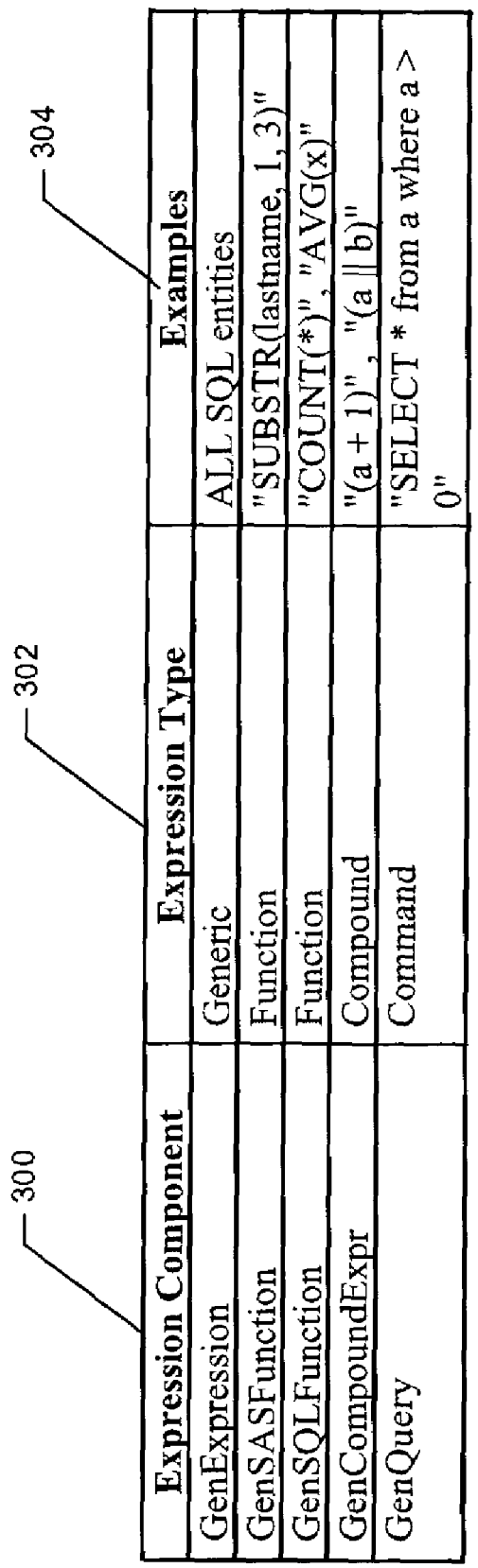
FIG. 9 is a tabular representation listing exemplary expression components.

The expression components discussed so far are conveniently categorized in FIG. 9. Column 300 denotes the expression components which operate upon their respective expression types shown in column 302. Column 304 shows an example of the expression types listed in column 302. However, it should be noted that command expressions can be extended to include other SQL statements.

Figure 10:
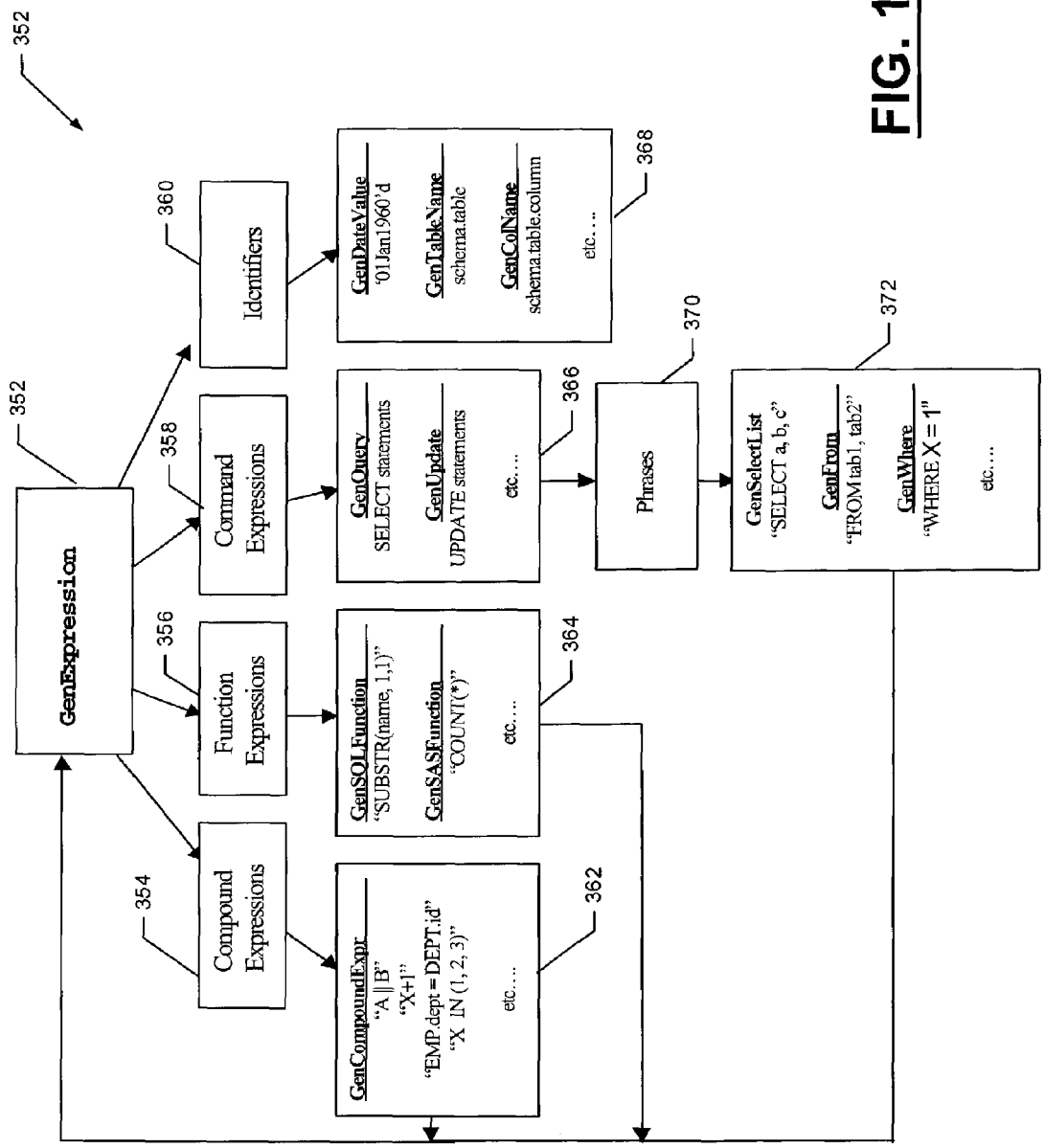
FIG. 10 is a process flow diagram showing exemplary processing of SQL statements.

FIG. 10 shows at 350 an exemplary component operational flow for processing input SQL statements. SQL entities are initially treated as generic expressions which are processed by the GenExpression expression component 352. The text method pointed to by the GenExpression component 352 calls identifier components 360 or more granular expression components (354, 356, 358) depending on what the SQL entity is. Block 368 illustrates several identifier components that could be invoked, such as the GenDateValue component which textualizes date values or the GenTableName component which textualizes table names.

The granular expression components (354, 356, 358) have more context than GenExpression 352, that is, they represent a specific type of expression like a compound expression 354, function expression 356, or command expression 358. Block 362 illustrates several compound situations where the GenCompoundExpr component would be used, such as to handle a concatenation operation "A||B" or an addition operation "X+i". Block 364 illustrates several function expression components that could be compound situations where the GenCompoundExpr component would be used, such as to handle a concatenation operation "A||B" or an addition operation "X+1". Block 366 illustrates several command expression components, such as a SELECT or UPDATE command expression. Because commands contain phrases, command expression components 358 invoke phrase components 370 to textualize phrases as shown in block 372.

Similar to GenExpression 352, granular expression components (354, 356, 358) also call identifier components 360 and other expression components, but within a more specific context. For example, the GenSASFunction component and the GenSQLFunction component (shown in block 364) have the context to know the type of function and how many arguments to process. They then call the GenExpression component 352 for each function argument.

To further illustrate the exemplary component operational flow, the example query described above is used and is as follows:

select a.empid, b.sal from emp a, hr b where b.hdat>'01jan1998'd order by b.sal;

We can see that at the highest level the entire query is a command expression that will be processed by the GenQuery expression component 358 shown in FIG. 10. Since GenQuery is itself an expression (as are all SQL commands), GenExpression 352 is the entry point into the text component system. It should be understood that the system may have different entry points, such as an entry point where the converted tree calls directly other component objects or the entry point is to a program that checks the syntax of the input SQL command with respect to the native database system's query language format.

After the driver loads the software appendage, exports its overrides, and does setup operations, it calls GenExpression 352 once to produce the entire SQL text from a provided SQL tree. In this example, this is true for all SQL commands, and all driver-provided overrides automatically get applied as needed because components utilize a common call interface. Drivers may also be free to perform setup operations. It should be noted that a query may also appear as an SQL entity within a query (referred to as a subquery or inline view), so GenQuery 358 may be called multiple times.

Figure 11:
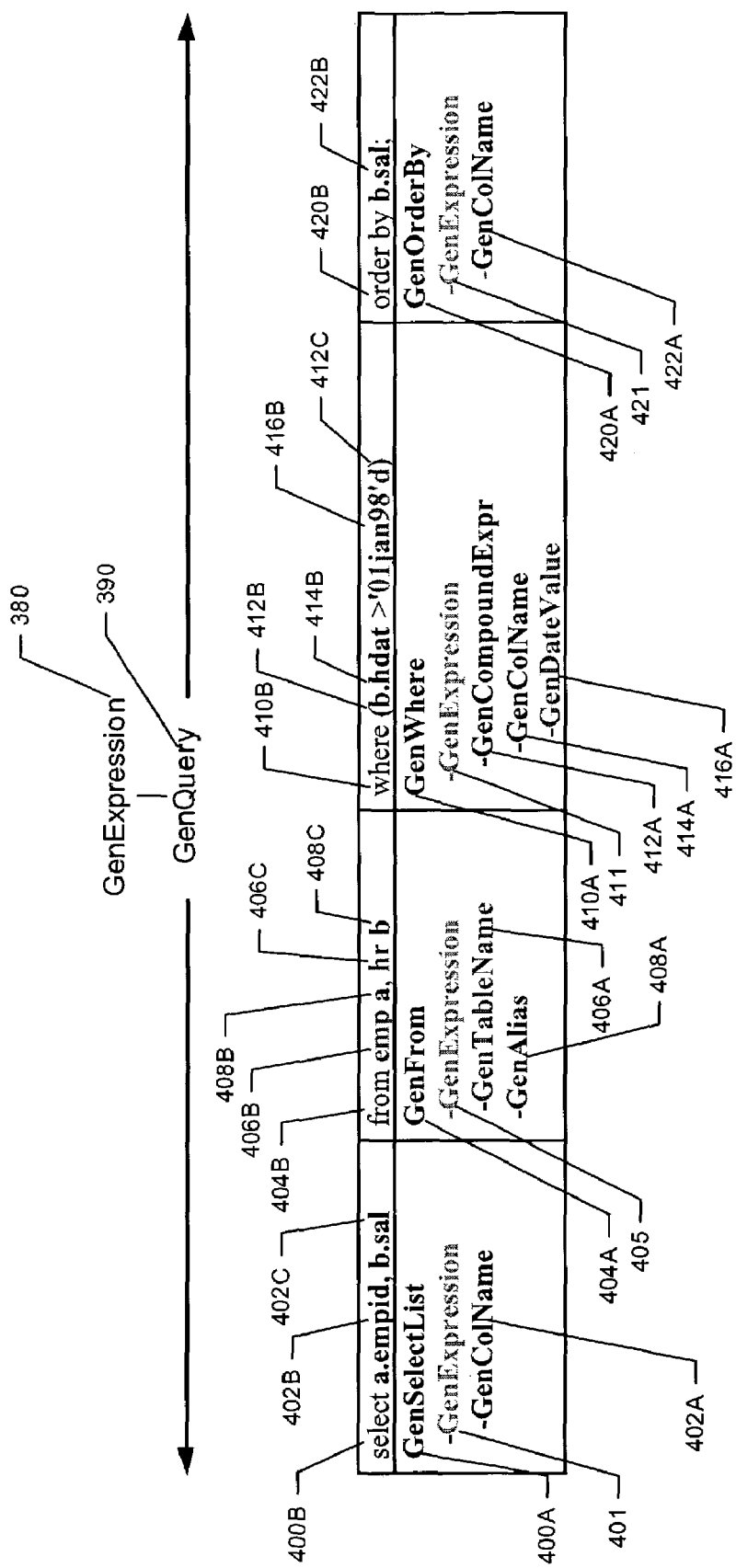
FIG. 11 is a process flow diagram showing processing of an example query statement.
Figure 17:
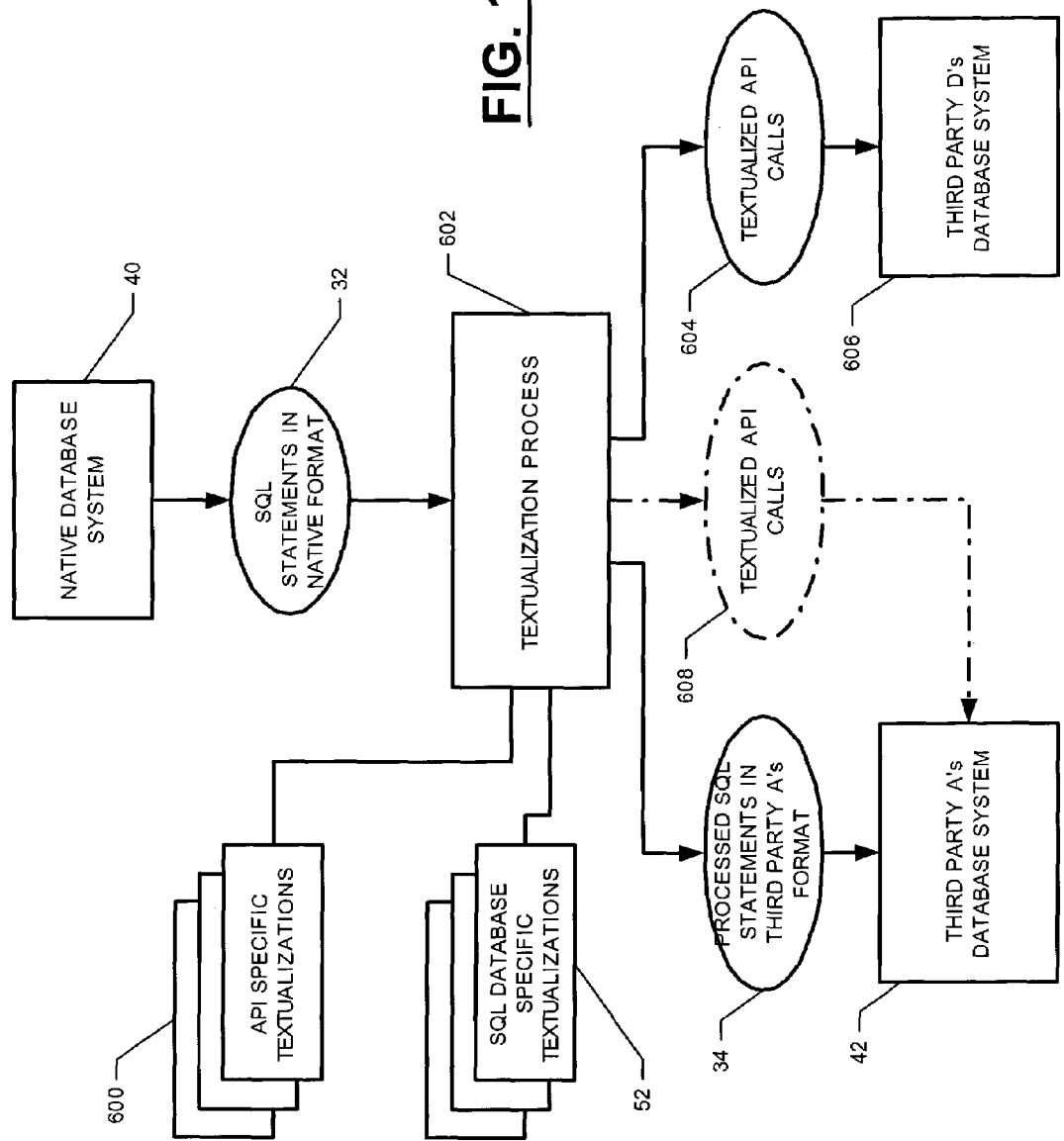
FIGS. 17 and 18 are block diagrams depicting software and computer components that convert database statements from a native system to application programming interfaces (APIs) for use in one or more third party systems.

FIG. 11 shows in greater detail the order in which different components are invoked in processing the example query. The driver calls GenExpression 380 to textualize the query. GenExpression 380 calls GenQuery 390 to process the SELECT statement. GenQuery 390 then calls the following phrase components: GenSelectList 400A; GenFrom 404A; GenWhere 410A; GenOrderBy 420A. The phrase components (400A, 404A, 410A, 420A) call GenExpression (401, 405, 411, 421) which, in turn, calls the appropriate identifier/expression components: GenExpression 401 calls GenColName 402A; GenExpression 405 calls GenTableName 406A; GenExpression 411 calls GenCompoundExpr 412A which calls GenColName 414A, and GenColName 414A calls GenDateValue 416A; GenExpression 421 calls GenColName 422A. Note that GenFrom 404A calls GenAlias 408A directly (because aliases are only valid for select list items and result sets). As illustrated in FIG. 11, recursion is used as a mechanism of textualization.

The following table lists what statement portions are textualized by which components (shown in FIG. 11):

| COMPONENT | STATEMENT PIECE |
| --- | --- |
| GenSelectList 400A | select 400B |
| GenColName 402A | a.empid 402B |
| | b.sal 402C |
| GenFrom 404A | from 404B |
| GenTableName 406A | emp 406B |
| | hr 406C |
| GenAlias 408A | a 408B |
| | b 408C |
| GenWhere 410A | where 410B |
| GenCompoundExpr 412A | ( ... ) 412B and 412C |
| GenColName 414A | b.hdat 414B |
| GenDate Value 416A | '01jan98'd 416B |
| GenOrderBy 420A | order by 420B |
| GenColName 422A | b.sal 422B |

A driver may have no need to override either GenExpression 380 or GenQuery 390 because they are both high-level expression components that utilize components common to all standard SQL implementations.

It is noted that GenSASFunction and GenSQLFunction components are much more driver-specific. Most third party drivers will need overrides to GenSASFunction since any SAS function would require a driver replacement function for a successful prepare. GenSQLFunction processes SQL-defined functions. This includes the standard aggregate functions along with any other SQL-defined functions (e.g., COALESCE, any new SQL-99 functions, etc.). Some drivers may need an override to GenSQLFunction.

Some drivers will also need overrides to GenCompoundExpr as well. Consider the case where a driver does not support "a||b" but instead supports "concat(a,b)". Or the driver may not support a default operator—for example, Sybase uses '+' instead of '||' for a concatenation operator). Driver overrides will be required for such cases.

FIG. 12 provides an exemplary component listing of different phrase components 450, expression components 452, and identifier components 454 that a textualization system might wish to use for a select SQL statement. It should be understood that this list may be extended for non-SELECT components.

While examples have been used to disclose the invention, including the best mode, and also to enable any person skilled in the art to make and use the invention, the patentable scope of the invention is defined by the claims, and may include other examples that occur to those skilled in the art. For example, different component objects may be used instead of or in addition to the above-listed component objects. As an illustration and with reference to FIG. 13, a "parent" component type 470 may be used in conjunction with overrides to other components. A "parent" component 470 is a static component that always points to a specific default method and is called from a corresponding override method when necessary. That is, when a driver exports an override to a given method, the parent component 470 gives the driver a mechanism to call back to the overridden default method. This may be used when an override method wishes to call back into the corresponding default (or parent) method to do the work when an override method does not require driver-specific processing for all cases of that method.

To illustrate this point, consider the concatenation situation in the GenCompoundExpr component. Suppose a driver does not support the default "a||b" construct but instead requires "concat(a,b)" or "a+b". Suppose further that concatenation is the only compound expression that differs from the default (given the assumption that there are many types of compound expressions). Although the driver will write an override to GenCompoundExpr to handle concatenation, the driver should not have to code for the other compound expression types since the default method already does that. Calling the parent method from the driver's GenCompoundExpr accomplishes this. The Sybase database system has this concatenation difference.

A driver for the Sybase database system may handle the concatenation override in a manner shown in FIG. 14. If it is determined at 500 that an SQL tree node is a concatenation node that requires Sybase-specific textualization, then code is executed at 510 to textualize the Sybase-specific concatenation. If it is not a node that requires special textualization, then the parent component of the GenCompoundExpr component is executed at 520.

As another example involving parent components, the handling of outer joins is described. Some RDBMSs do not support standard outer join syntax in their older versions. Oracle presently is one of these RDBMSs. A driver for such an Oracle database system provides overrides to GenFrom and GenWhere to allow for these syntactical differences. With reference to FIG. 15, the GenWhere component 550 would be required at 560 to put '(+)' outer join operators on WHERE conditions. Suppose the query only references INNER joins or we are dealing with a newer version of Oracle that does support standard outer join syntax. The default GenWhere may be used at 570 for those cases.

From the above examples we can see how the parent components are named with respect to the standard components. Optionally, a parent component has the same name as its corresponding standard component but prefixed with the term "Parent", and standard components have a corresponding parent as shown in FIG. 16.

We can now see how the parent components allow the drivers to be very granular in how they implement their override methods. Using this override mechanism combined with parent components, a driver may write just those cases of a method that differ from the default. Such a design maximizes code reuse. However, it should be noted that less optimal implementations may be used and still achieve advantages of the textualization system. As another example of the applicability and extensions of the textualization system, the textualization system may be applied to database system dialects other than SQL. As yet another example of the many applications and extensions of the system, the textualization system has general applicability to third party data store systems which are SQL-based. Such drivers can access RDBMSs as well as ERP systems and other such systems.

As yet another example of the wide variation of the textualization system, a textualization process 602 may textualize an input SQL statement 32 (which is formatted in a particular native database query format) as one or a set of application programming interface (API) calls 604. The API calls 604 are textualized so as to be compatible and directly executable within another database system 606 that utilizes API calls to perform database operations. It should be understood that the textualized API calls 604 may need to be compiled into machine code for execution within the second database system. The textualization process 602 accesses API specific textualizations 600 to translate the input SQL statement 32 to third party API call(s). As shown at 608, API calls may be textualized for a database system 42 which can also execute textualized third party formatted SQL statements 34.

Figure 18:
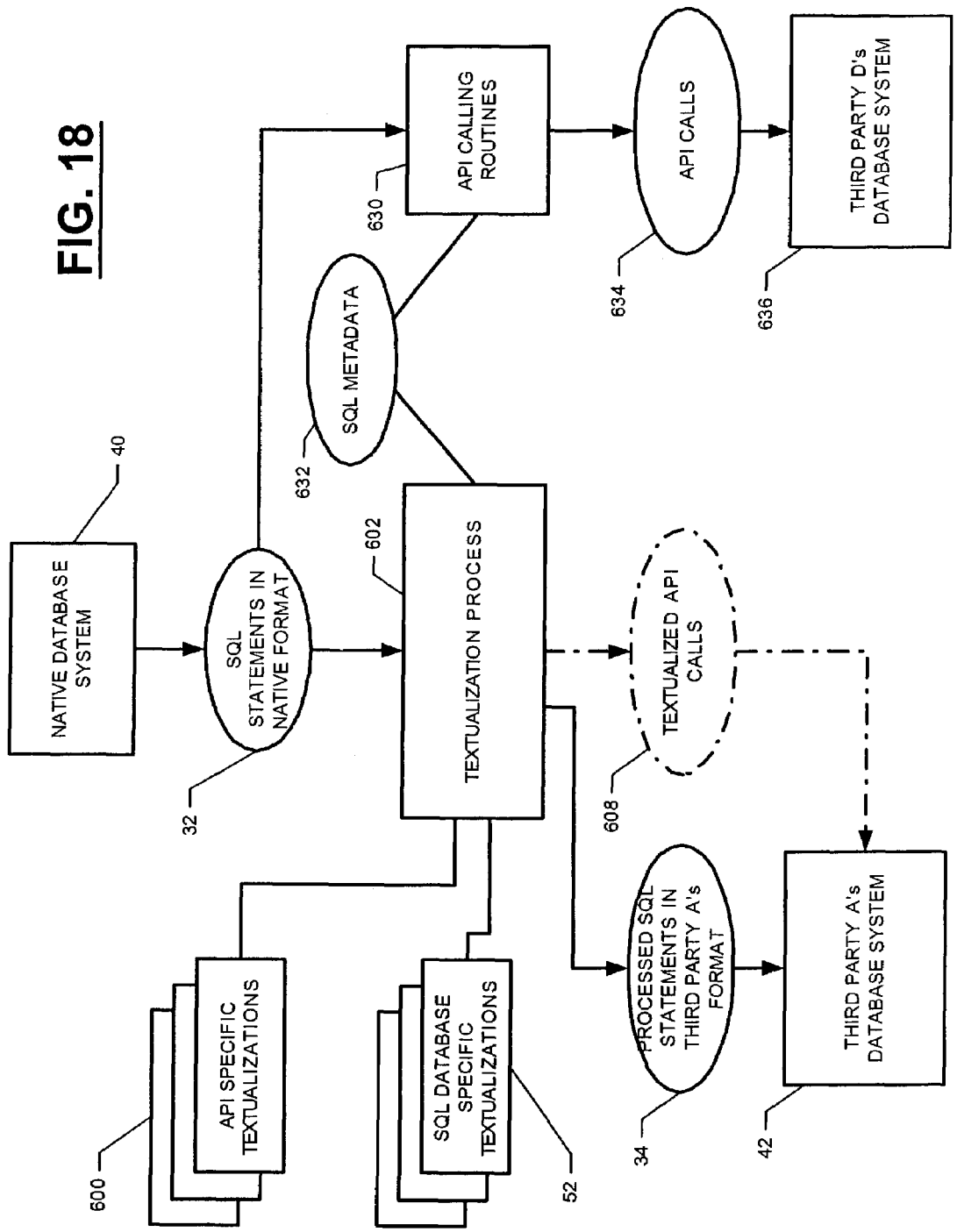

FIG. 18 illustrates a different variation wherein API calls 634 are not textualized. Rather, preexisting API calling routines 630 derive their calling parameters from the input SQL statement 32 and then make API calls 634 directly to a third party database system 636. SQL metadata 632 (such as may be found in the previously described SQL tree 60 of FIG. 2) may be used by the routines 630 to provide the parameters of the API calls 634. It is noted that the flexibility of the system is further shown in that SQL metadata 632 used by the routines 630 may also be used by the textualization process 602 in textualizing statements for other database systems. It should be understood that API calls may be made to database systems that can also receive textualized database statements.

Figure 19:
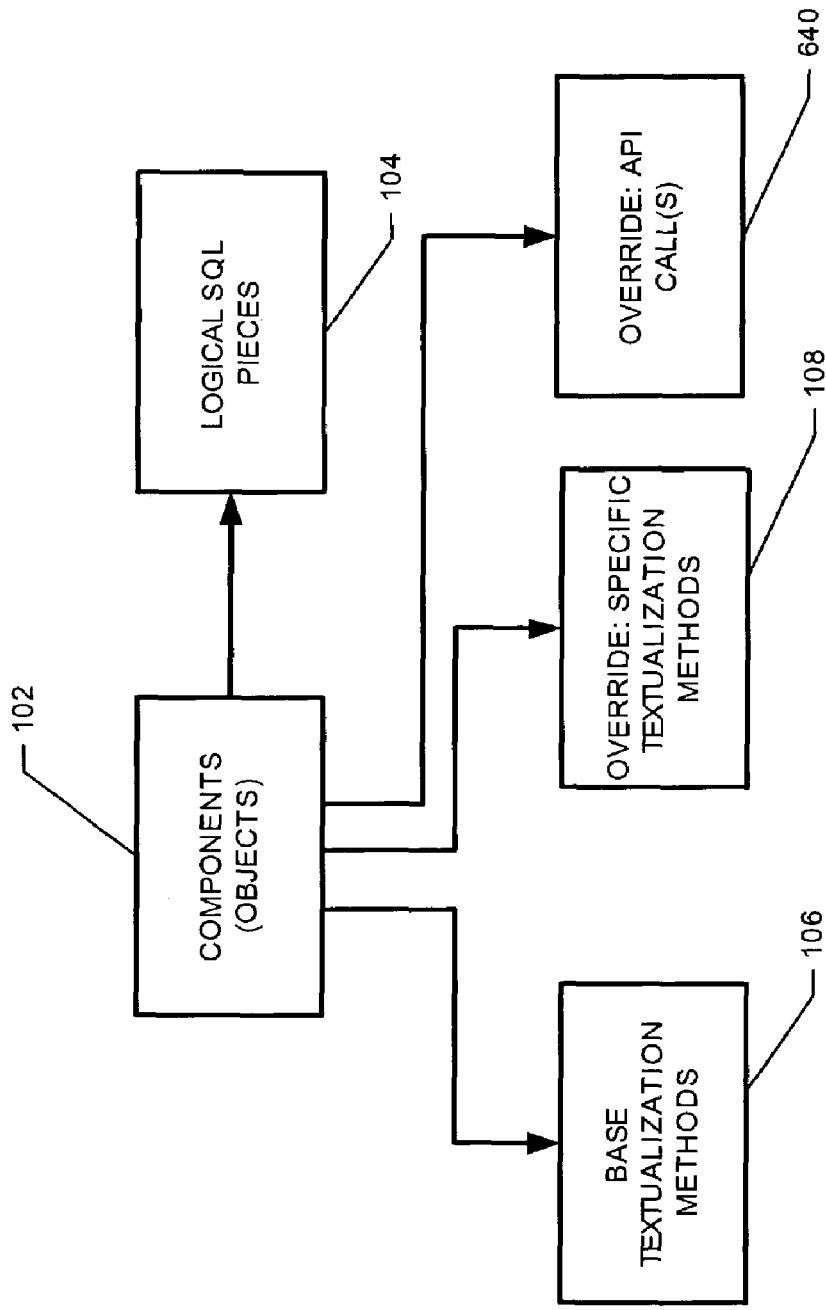
FIG. 19 is block diagram illustrating different override capabilities for component objects.

While not required, the textualization of API calls or the program call creation may employ the object-oriented technique described above. For example based upon the type of input SQL statement, the proper textualization components may be invoked in order to access the API textualization specific data. As another illustration and as shown in FIG. 19, the output from the components 102 may not be textualized database statements or textualized API calls. Instead, the components 102 may contain an override mechanism 640 wherein the components' output may be API calls to a third party database system.

It should be understood that the system disclosed herein is not limited to database systems that utilize APIs but includes database systems that can handle in general program calls that instruct database systems to access data contained within the database systems. Also, the providing of textualized database statements or API calls to third party database systems may be across one or more network connections in order to access the third party database systems.

It is claimed as the invention:

1. A computer-implemented method for handling a database statement from a first database system, comprising the steps of:

receiving a first fourth-generation language database statement from the first database system, wherein the first database statement is formatted according to the first database system's query language format;

accessing database functional language difference data, wherein the database functional language difference data indicates a format that contains at least one database functional statement difference from the first database system's query language format;

generating a second fourth-generation language database statement that is used within a second database system, wherein the second database statement is generated based upon the first database statement and upon the accessed database functional language difference data, wherein the second database statement is compatible with the second database system's query language format;

wherein a tree representative of the syntax of the database language used within the first database system and of metadata associated with the first database system is used in generating the second database statement wherein the tree contains logical pieces parsed from the first fourth-generation language database statement;

using a plurality of component software objects to textualize the logical pieces contained in the tree, wherein textualizing a logical piece includes generating fourth-generation database language text;

wherein a first component software object is associated with a first logical piece contained in the tree;

wherein the first component software object is associated with a first method to textualize, into fourth-generation database language text, the first component software object's associated logical piece that is contained in the tree;

using a plurality of software drivers to textualize logical pieces into fourth-generation database language text;

wherein a first software driver textualizes through a second method a logical piece into fourth-generation database language text that is compatible with the second database system's query language format;

wherein a second software driver textualizes through a third method a logical piece into fourth-generation database language text that is compatible with a third database system's query language format;

switching association of the first component software object from the first method to the second method for fourth-generation database language textualization:

wherein because of the switching of the association of the first component software object, the first component software object textualizes fourth-generation database language text that is compatible with the second database system's query language format and that is not compatible with the first database system's query language format.

2. The method of claim 1 wherein the database statement functional difference specifies at least a portion of a statement format that is compatible with the second database system's query language format and that is incompatible with the first database system's query language format wherein the tree contains a hierarchical arrangement of nodes representative of the SQL syntax and metadata to be used in generating the second database statement.

3. The method of claim 1 wherein object-oriented techniques are used to access the database functional language difference data.

4. The method of claim 3 wherein the object-oriented techniques contain SQL component objects, wherein a component object corresponds to a logical piece of an SQL statement.

5. The method of claim 4 wherein a logical piece is a phrase logical piece.

6. The method of claim 4 wherein a logical piece is an identifier logical piece.

7. The method of claim 4 wherein an SQL component object defaults to a default native SQL textualization method when generating the second database statement.

8. The method of claim 7 wherein an SQL component object comprises an override to account for functional differences between the first and second database systems' query language formats.

9. The method of claim 8 wherein SQL component objects comprise a phrase component object.

10. The method of claim 8 wherein SQL component objects comprise an identifier component object.

11. The method of claim 8 wherein SQL component objects comprise an expression component object.

12. The method of claim 8 wherein SQL component objects comprise a parent component object.

13. The method of claim 1 further comprising the steps of:
identifying, for the first database statement, query language parts that are common between the first database system's query language format and the second database system's query language format; and
generating the second database statement based upon the identified common query language parts.

14. The method of claim 13 wherein the language parts are common based upon a predetermined standardized query language format.

15. The method of claim 14 wherein the standardized query language format is based upon a standardized structured query language (SQL) version.

16. The method of claim 1 wherein the database functional language difference data facilitates the generation of the second database statement by specifying common language parts between the first and second database system's language formats.

17. The method of claim 16 wherein the language parts are common based upon a predetermined standardized query language format.

18. The method of claim 17 wherein the standardized query language format is based upon a standardized structured query language (SQL) version.

19. The method of claim 1 wherein the second database system is a different type of database system than the first database system.

20. The method of claim 1 wherein the second database statement manipulates data within the second database system from the first database system.

21. The method of claim 1 wherein generating automatically the second database statement provides the ability to transparently manipulate data within the second database system from the first database system.

22. The method of claim 1 wherein the generated second database statement is provided to the second database system and executed by the second database system.

23. The method of claim 1 wherein the generated second database statement is in a format such that the second database statement is directly executable by the second database system.

24. The method of claim 1 wherein the second database statement is a functional equivalent of the first database statement but for differences between the first and second database systems' query language formats.

25. The method of claim 1 wherein the first and second database systems' query language formats are based upon a predetermined standardized query language format.

26. The method of claim 1 wherein the first and second database systems' query language formats are based upon a standardized fourth-generation structured query language (SQL) version.

27. The method of claim 26 wherein the first database system's query language format utilizes a superset of the SQL standard.

28. The method of claim 26 wherein the second database system's query language format utilizes a superset of the SQL standard.

29. The method of claim 1 wherein the first and second database systems' query language formats specify different formats for a preselected query-related function, wherein the first database statement is formatted in the first database system's query language format to perform the query-related function,
wherein the second database statement is generated based upon the database functional difference data and is formatted in the second database system's query language format, wherein the generated second database statement is executable within the second database system and performs the query-related function within the second database system.

30. The method of claim 1 wherein the tree is an SQL tree that is used to generate the second database statement, wherein the SQL tree contains data that represents the syntax of the first database statement.

31. The method of claim 30 wherein the SQL tree contains metadata related to the first database statement.

32. The method of claim 31 wherein the first database statement is parsed into logical text pieces which are stored in the SQL tree.

33. The method of claim 32 wherein the second database statement takes into account any second database system-specific query language syntax.

34. The method of claim 1 further comprising the step of:
generating a third database statement for use within a third database system, wherein the third database statement is generated based upon the first database statement and upon the accessed database functional language difference data, wherein the third database statement is compatible with the third database system's query language format.

35. The method of claim 34 further comprising the step of:
generating a fourth database statement for use within a fourth database system, wherein the fourth database statement is generated based upon the first database statement and
upon the accessed database functional language difference data, wherein the fourth database statement is compatible with the fourth database system's query language format.

36. The method of claim 1 wherein the first and second database systems are relational database management systems.

37. The method of claim 1 wherein the first database system comprises a data mining application.

38. The method of claim 37 wherein the second database system comprises a relational database management system.

39. The method of claim 1 wherein the first database system comprises a relational database management system.

40. The method of claim 39 wherein the second database system comprises a data mining application.

41. The method of claim 1 wherein the first database system comprises an enterprise resource planning system.

42. The method of claim 41 wherein the second database system comprises an enterprise resource planning system.

43. The method of claim 1 wherein the first and second database systems' query language format includes format specifications for insert, select, update, and delete database commands.

44. The method of claim 1 wherein the first software driver's details of textualization into a different fourth-generation database language is hidden within the first software driver.

45. The method of claim 1 wherein the switching of the association includes switching pointing of the first method to the second method for the first software driver.

46. The method of claim 1 wherein the plurality of component software objects includes a phrase component software object, an identifier component software object, and an expression component software object.

47. The method of claim 46 wherein the phrase component software object handles textualization of database phrases;
   wherein the identifier component software object handles textualization of entities referenced in a database;
   wherein the expression component software object handles textualization of expressions.

48. The method of claim 47 wherein the phrase component software object handles textualization of database WHERE phrases;
   wherein the identifier component software object handles textualization of column names referenced in a database.

49. The method of claim 48 wherein the first database statement contains an expression which contains a phrase which contains an identifier;
   wherein the expression component software object processing the expression contained in the first database statement;
   wherein the expression component software object invokes the phrase component software object that processes the phrase contained in the first database statement;
   wherein the phrase component software object invokes the identifier component software object that processes the identifier contained in the first database statement.

50. Computer software stored on a computer readable media, the computer software comprising program code carrying out a method according to claim 1.

* * * * *

UNITED STATES PATENT AND TRADEMARK OFFICE
CERTIFICATE OF CORRECTION

PATENT NO.       : 7,447,686 B2  
APPLICATION NO.  : 10/303106  
DATED            : November 4, 2008  
INVENTOR(S)      : Levine Page 1 of 1

It is certified that error appears in the above-identified patent and that said Letters Patent is hereby corrected as shown below:

In column 10, line 43, delete "textualization:" and insert -- textualization; --.

Signed and Sealed this

Twenty-fourth Day of February, 2009

JOHN DOLL  
*Acting Director of the United States Patent and Trademark Office*